United States Patent
Huang et al.

(10) Patent No.: US 8,804,267 B2
(45) Date of Patent: Aug. 12, 2014

(54) DISK DRIVE PREDICTING SPINDLE MOTOR FAILURE BY EVALUATING CURRENT DRAW RELATIVE TO TEMPERATURE

(71) Applicant: Western Digital Technologies, Inc., Irvine, CA (US)

(72) Inventors: Yanan Huang, Torrance, CA (US); Chuanwen Ji, Irvine, CA (US); Duc T. Phan, Saratoga, CA (US); Chui Lyn Cheong, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/671,487

(22) Filed: Nov. 7, 2012

(65) Prior Publication Data

US 2014/0126081 A1 May 8, 2014

(51) Int. Cl.
*G11B 19/20* (2006.01)
(52) U.S. Cl.
USPC ............................ 360/55; 360/73.03; 360/71
(58) Field of Classification Search
None
See application file for complete search history.

(56) References Cited

U.S. PATENT DOCUMENTS

| | | | |
|---|---|---|---|
| 5,557,183 A * | 9/1996 | Bates et al. | 360/73.03 |
| 5,612,845 A | 3/1997 | Smith | |
| 5,617,339 A | 4/1997 | Smith | |
| 5,796,349 A | 8/1998 | Klein | |
| 6,078,455 A | 6/2000 | Enarson et al. | |
| 6,098,026 A | 8/2000 | Lee | |
| 6,489,738 B1 * | 12/2002 | Bates et al. | 318/434 |
| 6,707,269 B2 * | 3/2004 | Tieu | 318/592 |
| 6,876,606 B2 * | 4/2005 | Kajino et al. | 369/44.27 |
| 6,898,041 B2 * | 5/2005 | Sakamoto | 360/73.03 |
| 6,982,842 B2 * | 1/2006 | Jing et al. | 360/31 |
| 7,005,820 B2 * | 2/2006 | Tanner | 318/471 |
| 7,009,354 B2 | 3/2006 | Tanner | |
| 7,027,368 B2 * | 4/2006 | Kajino et al. | 369/44.27 |
| 7,234,067 B2 * | 6/2007 | Burton | 713/320 |
| 7,291,994 B2 * | 11/2007 | Assar et al. | 318/400.2 |
| 7,400,466 B2 * | 7/2008 | Lee et al. | 360/73.03 |
| 7,496,778 B2 * | 2/2009 | Burton | 360/137 |
| 7,567,401 B2 * | 7/2009 | Lee et al. | 360/73.03 |
| 7,656,625 B2 * | 2/2010 | Kajikawa | 361/29 |
| 7,707,461 B2 | 4/2010 | Dougherty et al. | |
| 7,738,211 B2 * | 6/2010 | Oyamada et al. | 360/75 |
| 7,808,738 B2 * | 10/2010 | Mitsunaga et al. | 360/75 |
| 7,830,642 B2 * | 11/2010 | Kajikawa et al. | 360/69 |
| 7,928,681 B2 * | 4/2011 | Kajikawa | 360/69 |
| 8,103,893 B2 * | 1/2012 | Burton | 713/324 |
| 2002/0159354 A1 * | 10/2002 | Nakabayashi | 369/53.18 |
| 2008/0037164 A1 * | 2/2008 | Oh et al. | 360/99.08 |
| 2008/0164833 A1 | 7/2008 | Kajikawa | |

* cited by examiner

Primary Examiner — Wayne Young
Assistant Examiner — James L Habermehl

(57) ABSTRACT

A disk drive is disclosed comprising a head actuated over a disk, and a spindle motor operable to rotate the disk. A baseline relationship is generated between a baseline current draw of the spindle motor over a temperature range. An operating current draw of the spindle motor is measured and a corresponding operating temperature is measured. Failure of the spindle motor is predicted based on the operating current draw, the operating temperature, and the baseline relationship.

16 Claims, 4 Drawing Sheets

DISK DRIVE PREDICTING SPINDLE MOTOR FAILURE BY EVALUATING CURRENT DRAW RELATIVE TO TEMPERATURE

BACKGROUND

Disk drives comprise a disk rotated by a spindle motor and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo control system to control the actuator arm as it seeks from track to track.

DETAILED DESCRIPTION

Figure 1:
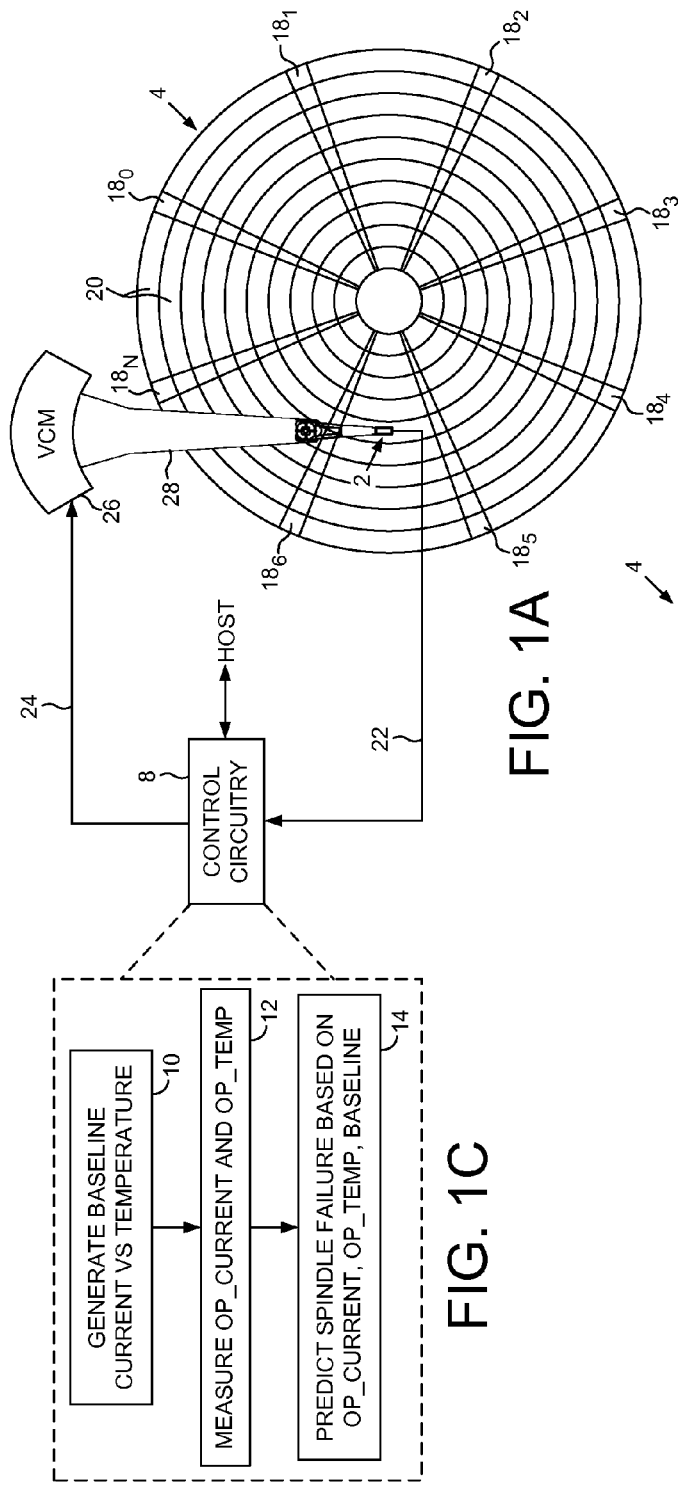
FIGS. 1A and 1B show a disk drive according to an embodiment of the present invention comprising a head actuated over a disk, and a spindle motor for rotating the disk.
FIG. 1C is a flow diagram according to an embodiment of the present invention wherein failure of the spindle motor is predicted based on an operating current draw of the spindle motor, an operating temperature, and a first baseline relationship of a baseline current draw of the spindle motor over a temperature range.

FIGS. 1A and 1B show a disk drive according to an embodiment of the present invention comprising a head 2 actuated over a disk 4, and a spindle motor 6 operable to rotate the disk 4. The disk drive further comprises control circuitry 8 operable to execute the flow diagram of FIG. 1 C, wherein a first baseline relationship is generated of a baseline current draw of the spindle motor 6 over a temperature range (block 10). An operating current draw of the spindle motor and a corresponding operating temperature is measured (block 12). A failure of the spindle motor is predicted based on the operating current draw, the operating temperature, and the first baseline relationship (block 14).

In the embodiment of FIG. 1A, the disk 4 comprises embedded servo sectors $18_0$-$18_N$ that define a plurality of servo tracks 20, wherein data tracks are defined relative to the servo tracks (at the same or different radial density). The control circuitry 8 processes a read signal 22 emanating from the head 2 to demodulate the servo sectors $18_0$-$18_N$ into an estimated position. The estimated position is subtracted from a reference position to generate a position error signal (PES) representing an error between the actual position of the head and a target position relative to a target track. The PES is filtered using a suitable compensation filter to generate a control signal 24 applied to a voice coil motor (VCM) 26 which rotates an actuator arm 28 about a pivot in order to actuate the head 2 radially over the disk 4 in a direction that reduces the PES. The servo sectors $18_0$-$18_N$ may comprise any suitable position information, such as a track address for coarse positioning and servo bursts for fine positioning. The servo bursts may comprise any suitable pattern, such as an amplitude-based servo pattern (e.g., a quadrature servo pattern), or a suitable phase-based servo pattern.

Any suitable spindle motor 6 may be employed in the embodiments of the present invention. In one embodiment, the spindle motor 6 comprises fluid dynamic bearings wherein a suitable lubricant (e.g., ester oil) is used in place of a conventional ball bearing. A significant factor in the longevity of the spindle motor 6 is the longevity of the lubricant employed in the fluid dynamic bearings. The lubricant will degrade over time due to oxidation and/or metal contaminates caused by friction between the hub and the face of the lubricant during spin-up. The lubricant may also leak out of the fluid dynamic bearing causing increased friction between the hub and the spindle shaft.

In one embodiment, the increased friction due to the degradation or leaking of the lubricant in the fluid dynamic bearing is detected by monitoring the current draw of the spindle motor 6. Any suitable technique may be employed to monitor the current draw of the spindle motor 6, wherein in one embodiment the control circuitry 8 comprises a power IC 30 (FIG. 1B) comprising a suitable current detector for detecting the amount of current needed for the spindle motor 6 to maintain the disk 4 rotating at a target speed. In another embodiment, the control effort applied to the spindle motor 6 in the feedback control system may represent the current draw of the spindle motor 6 so that a physical current detector is unnecessary. In one embodiment, the current draw of the spindle motor 6 is measured over a running window and averaged in order to help filter out noise from the current draw measurement.

In one embodiment, a viscosity of the lubricant in the fluid dynamic bearings in the spindle motor 6 various inversely relative to temperature. Consequently, the temperature can affect the current draw measurement when monitoring for degradation of the spindle motor 6. This is illustrated in FIG. 2 which shows an example of how the current draw of the spindle motor increases as the temperature decreases due to the increased viscosity of the lubricant in the fluid dynamic bearings.

In one embodiment, in order to account for the effect temperature has on the current draw of the spindle motor, a first baseline relationship is generated of a baseline current draw of the spindle motor 6 over a temperature range. In one embodiment, the first baseline relationship is generated during a manufacturing procedure before deploying each disk drive in the field. While each disk drive is deployed in the field, the control circuitry 8 monitors both the current draw of the spindle motor and the corresponding temperature and uses the first baseline relationship in order to predict failure of the spindle motor. For example, in one embodiment a threshold may be generated by adding a suitable offset to the first baseline relationship between the current draw of the spindle motor 6 and the current temperature. The control circuitry 8 may predict an impending failure of the spindle motor 6 if the current draw exceeds this threshold.

Figure 2:
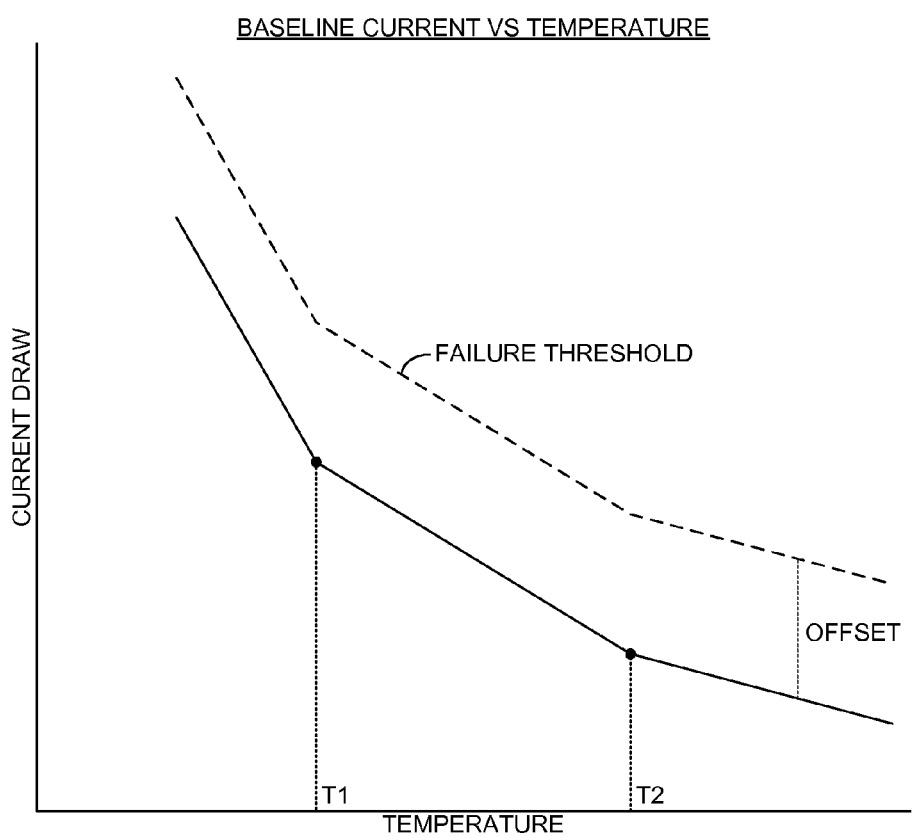
FIG. 2 shows an embodiment of the present invention wherein the first baseline relationship is generated during a manufacturing procedure by measuring the current draw of the spindle motor at two temperatures, curve fitting the measurements, and adding an offset to generate a failure threshold.

In one embodiment illustrated in FIG. 2, the procedure for generating the first baseline relationship of the spindle motor current draw over a temperature range is expedited by measuring a first baseline current draw at a first temperature (T1), measuring a second baseline current draw at a second temperature (T2), and fitting the first and second baseline current draw to a curve. Any suitable technique may be employed to implement the curve fitting aspect of the present invention, such as by adjusting one or more coefficients of a suitable function representing the exponential decay of the current draw relative to temperature. In another embodiment, a number of pre-characterized curves may be generated each representing a typical baseline relationship between current draw and temperature for a particular type of spindle motor (e.g., from a particular vendor). The first baseline relationship may then be generated by selecting the pre-characterized curve that best fits the first and second baseline current draw measurements at the first and second temperatures.

FIG. 2 also illustrates an embodiment wherein a failure threshold is generated by adding a suitable offset to the first baseline relationship of the spindle motor current draw over the temperature range. In one embodiment, the failure threshold may be generated dynamically by the control circuitry 8 after deploying the disk drive in the field. In another embodiment, the failure threshold curve shown in FIG. 2 may be stored with each disk drive during manufacturing, thereby obviating the need for the control circuitry 8 to compute the threshold.

In other embodiments of the present invention, the control circuitry 8 may employ different techniques for predicting an impending failure of the spindle motor 6. For example, the control circuitry 8 may detect an impending failure based on the derivative of the spindle motor current draw relative to the first baseline relationship and the current temperature. For example if the current draw of the spindle motor 6 is increasing quickly, it may indicate the lubricant is leaking from the fluid dynamic bearings and therefore an impending failure of the spindle motor 6 is more likely.

Figure 3:
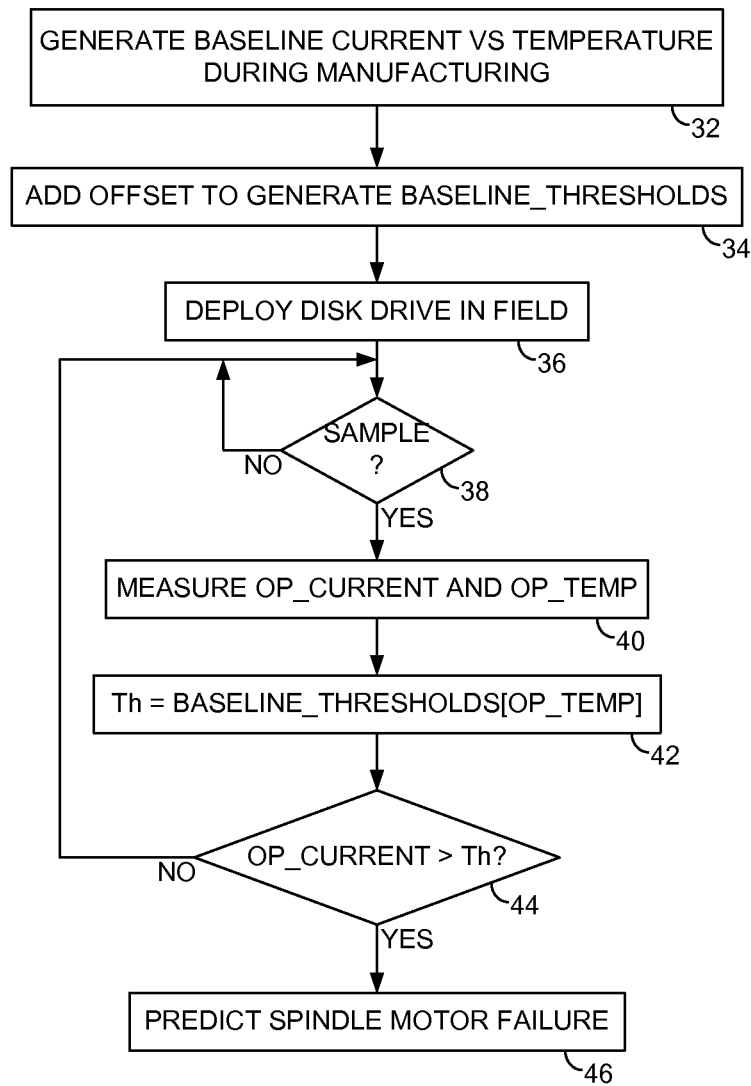
FIG. 3 is a flow diagram according to an embodiment of the present invention wherein while the disk drive is deployed in the field, the control circuitry periodically measures the current draw of the spindle motor and the operating temperature in order to predict failure of the spindle motor based on the first baseline relationship.

FIG. 3 is a flow diagram according to an embodiment of the present invention illustrating an overview of the failure prediction for the spindle motor 6. A first baseline relationship of the spindle motor current draw over a temperature range is generated during a manufacturing procedure of each disk drive (block 32). An offset is added to the first baseline relationship to generate an array of corresponding baseline thresholds (block 34). After deploying a disk drive in the field (block 36), the control circuitry 8 periodically performs a sampling of the spindle motor current draw (block 38). The spindle motor current and the corresponding temperature are measured (block 40), and a corresponding threshold is generated by indexing the array of baseline thresholds with the current temperature (block 42). If the spindle motor current draw exceeds the threshold (block 44), the control circuitry 8 predicts an impending failure of the spindle motor (block 46) and takes appropriate action, such as warning a host of the impending failure. The flow diagram of FIG. 3 is repeated periodically by the control circuitry 8 over the life of the disk drive at any suitable interval, wherein the interval may decrease over time in order to increase the sampling frequency. In one embodiment, the control circuitry 8 may increase the sampling frequency as the spindle motor current draw approaches the failure threshold to help ensure an impending failure condition is predicted prior to an actual catastrophic failure.

Figure 4:
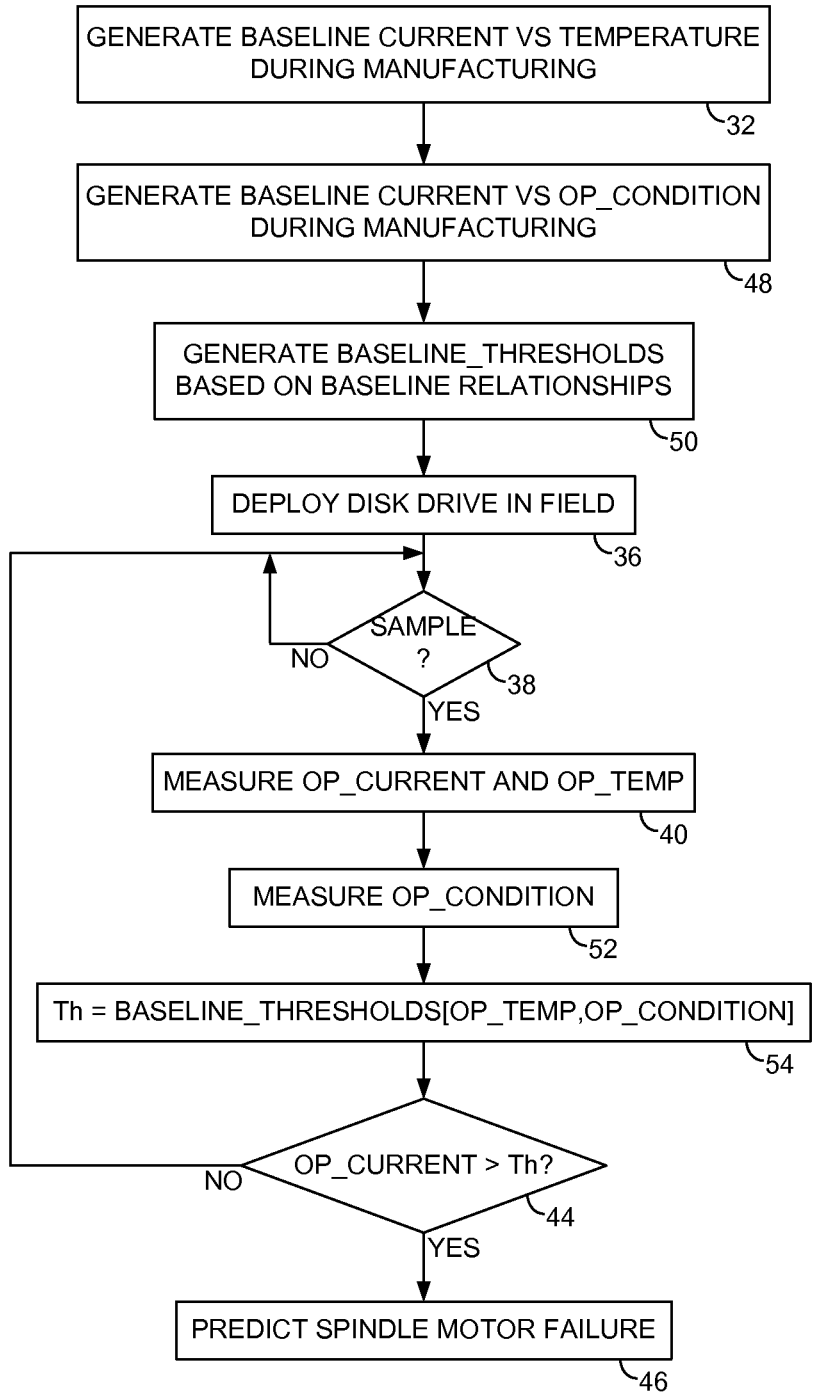
FIG. 4 is a flow diagram according to an embodiment of the present invention wherein a second baseline relationship is generated of the baseline current draw of the spindle motor over a range of a secondary operating condition, wherein failure of the spindle motor is predicted based on the first and second baseline relationships.

FIG. 4 is a flow diagram according to an alternative embodiment of the present invention which extends on the flow diagram of FIG. 3. In this embodiment, one or more operating conditions may affect the spindle motor current draw in addition to the temperature. Accordingly in this embodiment, a second baseline relationship is generated during a manufacturing procedure of the baseline current draw of the spindle motor over a range of a secondary operating condition (block 48). Any number of different operating conditions may affect the spindle motor current draw, such as humidity, altitude, pressure, the spindle motor speed, the orientation of the disk drive (e.g., upright horizontal, inverted horizontal, vertical, etc.), a radial location of the head over the disk (e.g., an outer diameter location versus an inner diameter location), or whether the head is unloaded onto a ramp or loaded onto the disk (head unload/load condition). A multi-dimensional array of baseline thresholds is then generated based on the baseline relationships between the spindle motor current draw and temperature as well as the other operating conditions that affect the current draw. When the sampling interval expires (block 38) while the disk drive is deployed in the field, the spindle motor current draw and corresponding temperature are measured (block 40), and the at least one operating condition is measured (block 52). A threshold is then generated by indexing the multi-dimensional array of baseline thresholds with the current temperature and the at least one operating condition (block 54). If the spindle motor current draw exceeds the threshold (block 44), the control circuitry 8 predicts an impending failure of the spindle motor (block 46) and takes appropriate action.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
a disk;
a head actuated over the disk;
a spindle motor operable to rotate the disk; and
control circuitry operable to:
generate a first baseline relationship of a baseline current draw of the spindle motor over a temperature range;
measure an operating current draw of the spindle motor and a corresponding operating temperature; and
predict failure of the spindle motor based on the operating current draw, the operating temperature, and the first baseline relationship.

2. The disk drive as recited in claim 1, wherein the control circuitry is further operable to:
   generate a threshold relative to the baseline current draw corresponding to the operating temperature in the first baseline relationship; and
   predict failure of the spindle motor when the operating current exceeds the threshold.

3. The disk drive as recited in claim 2, wherein the control circuitry is further operable to generate the threshold by adding an offset to the baseline current draw corresponding to the operating temperature in the first baseline relationship.

4. The disk drive as recited in claim 1, wherein the control circuitry is further operable to generate the first baseline relationship by:
   measuring a first baseline current draw at a first temperature;
   measuring a second baseline current draw at a second temperature; and
   fitting the first and second baseline current draw to a curve.

5. The disk drive as recited in claim 4, wherein the control circuitry is operable to:
   measure the first and second baseline current draw during a manufacturing procedure; and
   measure the operating current draw while the disk drive is deployed in the field.

6. The disk drive as recited in claim 1, wherein the control circuitry is operable to periodically measure the operating current draw of the spindle motor and the corresponding operating temperature and predict failure of the spindle motor over the life of the disk drive.

7. The disk drive as recited in claim 1, wherein the control circuitry is operable to:
   generate a second baseline relationship of the baseline current draw of the spindle motor over a range of a secondary operating condition; and
   predict failure of the spindle motor based on the operating current draw, the operating temperature, the first baseline relationship, and the second baseline relationship.

8. The disk drive as recited in claim 7, wherein the operating condition comprises at least one of humidity, altitude, pressure, spindle motor speed, orientation of the disk drive, a radial location of the head over the disk, and an unload/load condition of the head.

9. A method of operating a disk drive, the disk drive comprising a head actuated over a disk, and a spindle motor operable to rotate the disk, the method comprising:
   generating a first baseline relationship of a baseline current draw of the spindle motor over a temperature range;
   measuring an operating current draw of the spindle motor and a corresponding operating temperature; and
   predicting failure of the spindle motor based on the operating current draw, the operating temperature, and the first baseline relationship.

10. The method as recited in claim 9, further comprising:
    generating a threshold relative to the baseline current draw corresponding to the operating temperature in the first baseline relationship; and
    predicting failure of the spindle motor when the operating current exceeds the threshold.

11. The method as recited in claim 10, further comprising generating the threshold by adding an offset to the baseline current draw corresponding to the operating temperature in the first baseline relationship.

12. The method as recited in claim 9, further comprising generating the first baseline relationship by:
    measuring a first baseline current draw at a first temperature;
    measuring a second baseline current draw at a second temperature; and
    fitting the first and second baseline current draw to a curve.

13. The method as recited in claim 12, further comprising:
    measuring the first and second baseline current draw during a manufacturing procedure; and
    measuring the operating current draw while the disk drive is deployed in the field.

14. The method as recited in claim 9, further comprising periodically measuring the operating current draw of the spindle motor and the corresponding operating temperature and predict failure of the spindle motor over the life of the disk drive.

15. The method as recited in claim 9, further comprising:
    generating a second baseline relationship of the baseline current draw of the spindle motor over a range of a secondary operating condition; and
    predicting failure of the spindle motor based on the operating current draw, the operating temperature, the first baseline relationship, and the second baseline relationship.

16. The method as recited in claim 15, wherein the operating condition comprises at least one of humidity, altitude, pressure, spindle motor speed, orientation of the disk drive, a radial location of the head over the disk, and an unload/load condition of the head.

* * * * *